United States Patent [19]

Lynch

[11] Patent Number: 4,481,787
[45] Date of Patent: Nov. 13, 1984

[54] SEQUENTIALLY CONTROLLED SINGLE EVAPORATOR REFRIGERATOR

[75] Inventor: Neil P. Lynch, Berrien County, Mich.

[73] Assignee: Whirlpool Corporation, Benton Harbor, Mich.

[21] Appl. No.: 398,955

[22] Filed: Jul. 16, 1982

[51] Int. Cl.³ .............................................. F25D 17/00
[52] U.S. Cl. ...................................... 62/180; 62/229; 236/46 R
[58] Field of Search ............... 62/180, 229, 179, 187, 62/209; 236/46 R, 1 EA; 165/12; 364/166

[56] References Cited

U.S. PATENT DOCUMENTS

| | | | |
|---|---|---|---|
| 3,012,412 | 12/1961 | Muffly | 62/176 |
| 3,248,894 | 5/1966 | Harbour | 62/156 |
| 3,290,893 | 12/1966 | Haldopoulos | 62/187 |
| 3,373,577 | 3/1968 | Bohman | 62/180 |
| 3,730,819 | 5/1973 | Evalds | 165/26 |
| 4,122,687 | 10/1978 | McKee | 62/156 |
| 4,265,299 | 5/1981 | Harnish | 165/12 |
| 4,307,576 | 12/1981 | Takano et al. | 62/204 |
| 4,338,791 | 7/1982 | Stamp, Jr. et al. | 236/1 EA |

Primary Examiner—William E. Wayner
Attorney, Agent, or Firm—Wood, Dalton, Phillips, Mason & Rowe

[57] ABSTRACT

A single evaporator refrigerator-freezer is controlled for operation in three modes, wherein cooling of the refrigerator compartment is initiated in a first mode by operating only an evaporator fan to cool the compartment. During the first mode, the rate of temperature change within the refrigerator compartment is calculated at predetermined time intervals and if the calculated rate is positive for at least a minimum number of time intervals, a second mode is initiated by operating a compressor to cool the refrigerator compartment. A third mode, wherein the compressor is operated to cool the freezer compartment, is initiated only after the refrigerator compartment has been adequately cooled. Means are further provided for modulating the flow of refrigerant to the evaporator to allow the evaporator to be operated at a higher temperature and pressure during cooling of the refrigerator than during cooling of the freezer.

32 Claims, 5 Drawing Figures

SEQUENTIALLY CONTROLLED SINGLE EVAPORATOR REFRIGERATOR

BACKGROUND OF THE INVENTION

1. Field of the Invention

This invention relates to a sequentially controlled single evaporator refrigerator/freezer which is energy efficient and provides improved temperature and humidity performance within the individual compartments.

2. Description of the Background Art

Sequentially controlled single evaporator refrigerators have been known to include a single evaporator fan and temperature responsive solenoid actuated dampers which direct the flow of air to cool either a refrigerator compartment or a freezer compartment. Solenoid actuated dampers have been found to be somewhat unreliable in that the dampers can freeze in either an open or closed position preventing cooling of one of the compartments. Further, waste heat generated by the actuation of the dampers provides an added heat load to the interior of the refrigerator.

These known single evaporator refrigerators have been controlled to operate with the evaporator fan continuously running, and with the compressor being energized in response to the actual temperature within each of the compartments. Because the compressor is operated in response to the actual temperature within a compartment, a short term rise in the temperature will cause the compressor to turn on. Further, because the compressor operation is independently controlled by the temperature within each of the individual compartments, transient losses occur when the compressor is de-energized by one compartment and rapidly thereafter energized by the other compartment resulting in a low coefficient of performance. Rapid cycling of the compressor can also cause the compressor to lock-up and overload due to adverse starting pressures.

SUMMARY OF THE INVENTION

In accordance with the present invention, the disadvantages of prior sequentially controlled single evaporator refrigerators have been overcome.

The single evaporator refrigerator of the present invention is sequentially controlled for operation in three modes, wherein cooling of the refrigerator compartment is initiated in a first mode by operating only an evaporator fan. The rate of temperature change within the refrigerator compartment is sensed and if it indicates that the temperature is no longer being reduced during the first mode, a second mode is initiated by operating a compressor in addition to the evaporator fan. A third mode, wherein the compressor and fan are operated to cool the freezer, is initiated only after the refrigerator compartment has been adequately cooled. Sensing the rate of temperature change within the refrigerated compartment provides improved energy efficiency because the compressor is energized only if and when it becomes necessary, thereby cooling the refrigerator compartment to the desired level while avoiding unnecessary operation of the evaporator fan and condenser.

During the first mode of operation, cooling of the refrigerator compartment and defrosting of the evaporator occur concurrently, resulting in a desirable increased humidity level in the refrigerator compartment. Further, the refrigerator compartment is cooled with only an evaporator fan operating so that a minimum amount of energy is expended. At the same time the refrigerator compartment is cooled, the above-freezing return air is recirculated over the evaporator for defrosting so that maximum energy efficiency is provided. Even if the defrost heat provided by the first mode is insufficient to completely defrost the evaporator, the amount of additional energy required to complete the defrost is greatly reduced.

The rate of temperature change within the refrigerator compartment is determined in the first mode by sampling the compartment's temperature at predetermined time intervals. At each sample time the instantaneous divergence of the sampled temperature from a set point value is calculated and the previously calculated divergence is subtracted therefrom, to provide the time derivative of the compartment temperature. Each time a positive derivative is calculated, a counter is incremented. If the contents of the counter reaches a predetermined count, indicating that the refrigerator compartment has been warming for at least a minimum period of time, the second mode of operation is initiated. Because the rate of temperature change is monitored as opposed to the actual temperature within the compartment, operation of the compressor in response to short term fluctuations in the temperature is prevented.

During the second mode, with the compressor and evaporator fan operating to cool the refrigerator compartment, the evaporator is operated at a higher temperature and pressure than during the cooling of the freezer, resulting in a high coefficient of performance. A means for modulating the flow of refrigerant to the evaporator is utilized to allow the evaporator to be operated at different temperatures and pressures depending on whether the refrigerator or freezer compartment is being cooled. The modulating means further maintains the superheat out of the evaporator at a constant, minimum level to insure sufficient wetting of the evaporator while preventing liquid refrigerant from flowing back to the compressor.

After the refrigerator compartment has been adequately cooled in the second mode, the temperature within the freezer compartment is checked to determine whether cooling of that compartment is required. If cooling of the freezer compartment is required, the flow of refrigerated air being discharged from the evaporator is switched from the refrigerator compartment to the freezer compartment.

The refrigerator further includes a dual evaporator fan system, having individual evaporator fans associated with each of the refrigerator and freezer compartments and selectively operable to direct the flow of refrigerated air to the appropriate compartment. The dual fan system eliminates the need for solenoid actuated dampers and the problems associated therewith.

Other features of the invention will be apparent from the following description and from the drawings.

DETAILED DESCRIPTION

Figure 1:
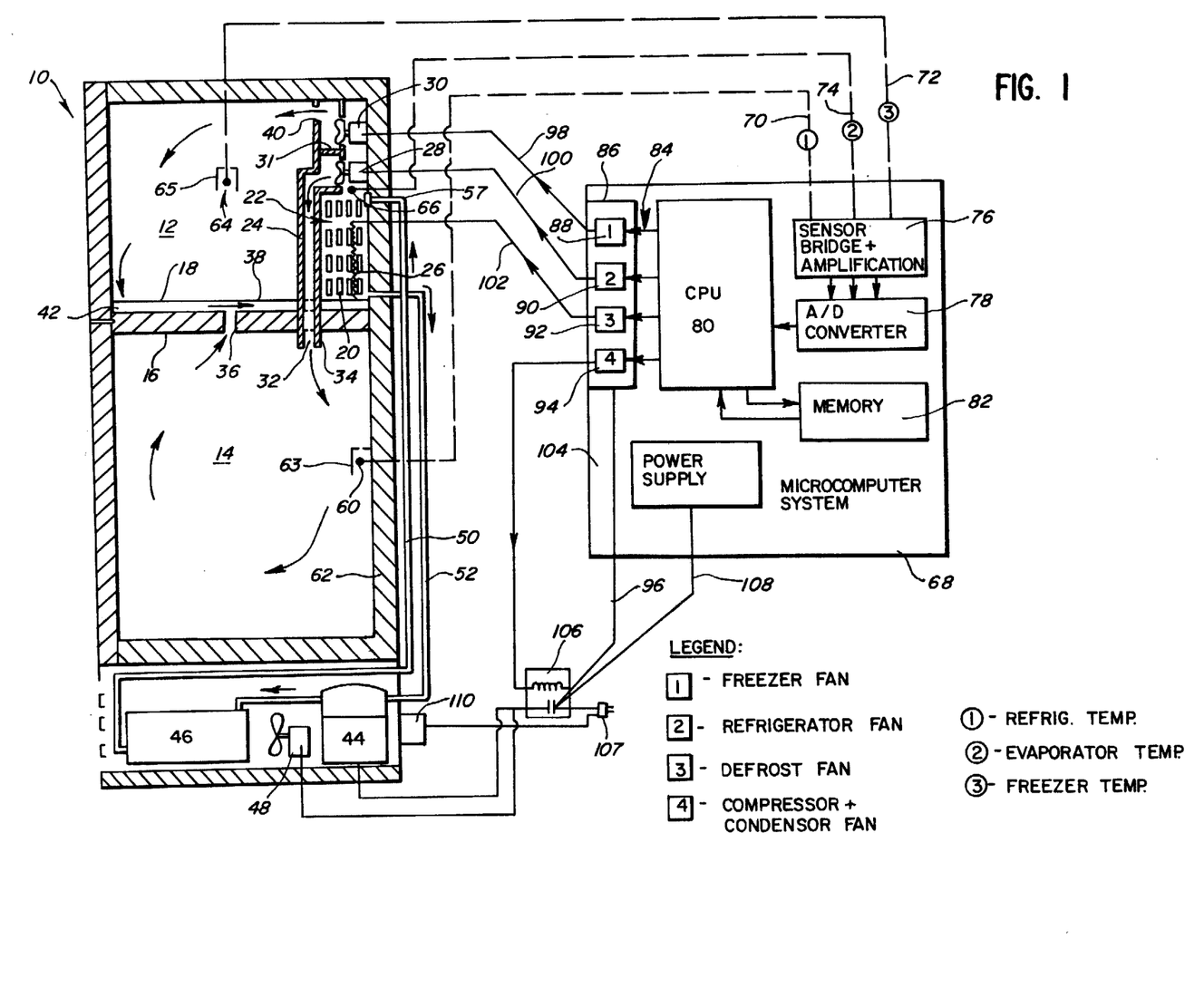
FIG. 1 is a side elevational view of a single evaporator refrigerator with the sequential control system of the present invention shown in block diagram form.

A sequentially controlled single evaporator refrigerator 10 is shown in FIG. 1 having an upper freezer compartment 12 for storing frozen foods and a lower refrigerator compartment 14 for storing fresh foods. The freezer compartment 12 is insulated from the refrigerator compartment 14 by a partition 16 underlying and spaced from the floor 18 of the freezer.

A single evaporator coil 20 is positioned within an insulated compartment 22 located at the rear of the freezer compartment 12 and separated therefrom by an insulated partition wall 24. Disposed between the coils of the evaporator 20 is a defrost heater 26 which may be a conventional resistive heater. The insulated compartment 22 also houses a dual evaporator fan system positioned above the evaporator coil 20. The dual fan system includes a refrigerator evaporator fan 28 and a freezer evaporator fan 30, the air flow outlet paths of which are separated by a partition 31 extending from the wall 24.

Air is refrigerated as a result of being passed in a heat exchange relationship with the evaporator coil 20. When the evaporator fan 28 is energized, the refrigerated air passed over the coil 20 is forced through an insulated discharge duct 32 into the refrigerator compartment 14, the discharge duct being formed in part by the partition wall 24 and a wall 34. The refrigerated air, after circulating through the refrigerator compartment 14, returns to the evaporator compartment 22 through an inlet port 36 leading to an air space 38 between the partition 16 and the freezer floor 18, the air flowing around the partition wall 24 and the discharge duct 32 back to the evaporator coil 20. The freezer evaporator fan 30 when energized, forces refrigerated air passed over the evaporator coil 20 through a discharge outlet 40 into the freezer compartment 12. Return air from the freezer compartment 12 is circulated through an air inlet 42 in the floor 18 of the freezer to the air space 38 from which it flows back to the evaporator compartment 22.

The apparatus for supplying refrigerant to the evaporator coil includes a conventional compressor 44, a condenser 46 and a condenser fan 48 for circulating air through the condenser. Refrigerant flows from the compressor and condenser through tubing 50 to an inlet of the evaporator coil 20, the return refrigerant flowing back to the compressor through tubing 52 connected to the outlet of the evaporator coil.

A thermostatic expansion valve 54 is disposed at the inlet to the evaporator coil 20 and controls the flow of refrigerant into the coil as a function of the temperature sensed at the outlet of the evaporator coil. In response to the sensed temperature, the thermostatic expansion valve 54 modulates the refrigerant flow to the evaporator coil 20, allowing the evaporator to be operated at different temperature and pressure conditions depending on whether the freezer compartment 12 or the refrigerator compartment 14 is being cooled. In particular, the thermostatic expansion valve 54 operates the evaporator 20 at a higher temperature and pressure during the cooling of the refrigerator compartment than during the freezer cooling resulting in a high coefficient of performance. The modulation provided by the thermostatic expansion valve 54 further operates to maintain a nearly constant superheat of refrigerant out of the evaporator coil so as to prevent liquid refrigerant from flowing back to the compressor while insuring sufficient wetting of the interior surface of the evaporator. It is noted that a conventional capillary tube restrictor could be employed in place of the thermostatic expansion valve. However, a capillary tube does not provide the same degree of refrigerant flow modulation as provided by a thermostatic expansion valve so that the energy savings would be less when a capillary tube is used.

A weighted thermistor is disposed within each of the freezer compartment 12, the refrigerator compartment 14 and the evaporator compartment 22 in order to sense the average temperature therein. A thermistor 60 disposed in the refrigerhtor compartment 14 is located at midheight in the center of the rear liner wall 62 and spaced approximately 1" outwardly therefrom. A small shield 63 protects the thermistor 60 from physical abuse while allowing air flow to the device. A thermistor 64 disposed in the freezer compartment 12 is located at midheight within the compartment, in the center of a side liner wall, not shown, and spaced approximately 1" therefrom. This thermistor is also provided with a shield 65 which allows air flow to the thermistor. A thermistor 66 is used to sense the evaporator coil temperature, and is attached to the evaporator coil in proximity with the refrigerant inlet of the coil.

Because the thermistors 60, 64 and 66 are weighted, the temperature response of each is delayed so as to smooth out any temporary, short term fluctuations which typically occur in the temperatures being sensed. This weighting may be provided by surrounding the thermistors with a thermal mass or by the use of electronic circuitry for processing the thermistor signals to eliminate the short term fluctuations.

The temperature signals from the weighted thermistors 60, 64 and 66 are input on lines 70, 72 and 74 respectively to a microcomputer system 68 which, in response to the sensed temperature selectively energizes the refrigerator evaporator fan 28, the freezer evaporator fan 30, the defrost heater 26 and the compressor 44 and condenser fan 48. The temperature signals input to the microcomputer 68 are applied to a sensor bridge and amplification circuitry 76, the bridge being a resistive bridge which converts the thermistor signals to voltage levels which are amplified and applied to an analog to digital converter 78. The analog to digital converter 78 converts the voltages representing the temperatures of the respective refrigerator, freezer and evaporator compartments to digital signals which may be utilized by a central processing unit 80. The central processing unit 80 operates in accordance with a program stored in a memory 82 to determine the correct mode of operation for the refrigerator 10 as discussed below.

The central processing unit 80 provides output signals on lines 84 to an output module 86 which includes four optical couplers 88, 90, 92 and 94. The optical couplers, when actuated by the central processing unit 80, switch 115 volts A.C., provided on a line 96, to output lines 98, 100, 102 and 104 which are respectively connected to the freezer evaporator fan 30, the refrigerator evaporator fan 28, the defrost heater 26 and the compressor 44 and condenser fan 48 for selective energization thereof. The optical coupler 94 is connected to the compressor 44 and the condenser fan 48 through a conventional compressor relay 106. The relay 106 is connected to a power source through a socket 107 for providing 115 volts A.C. on line 96 and 115 volts A.C. on a line 108 to the power supply of the microcomputer system 68, all the neutral lines of the system being connected to a junction box 110.

The microcomputer system 68 controls the sequential operation of the refrigerator 10 in one of three modes in response to the temperature input signals. The system operation begins by checking the temperature of the refrigerator compartment 14 and if cooling is required a first mode of operation is initiated. In the first mode of operation, the refrigerator compartment 14 is cooled by energizing only the refrigerator fan 28 via the optical coupler 90. The circulation of above-freezing air from compartment 14 to the evaporator 20 and back into compartment 14 cools the air and removes frost from the evaporator. While operating in this first mode, the microcomputer system 68 monitors the rate of temperature change within the refrigerator compartment 14 and if the rate of change rises above a predetermined value, indicating that the refrigerator compartment has been warming for at least a minimum period of time, a second mode of operation is initiated. In the second mode of operation, the compressor 44 and the condenser fan 48 are energized by the optical coupler 94 through the compressor relay 106, the evaporator fan 28 remaining on to cool the refrigerator compartment 14. The microcomputer system initiates a third mode of operation to cool the freezer compartment 12 only after the refrigerator compartment 14 has been cooled to a desired temperature. In the third mode of operation, the refrigerator evaporator fan 28 is de-energized by removing the signal from the optical coupler 90 and the freezer evaporator fan 30 is energized by actuation of the optical coupler 88, the compressor 44 and condenser fan 48 remaining in operation.

The sequential operation of the single evaporator refrigerator 10 in each of the three modes will now be described in detail with reference to FIGS. 1 and 2. At the start of the system operation, point A, the evaporator fans 28 and 30, the compressor 44 and the condenser fan 48 are off. When the temperature in the refrigerator compartment 14, as sensed by the thermistor 60, rises 5° above a refrigerator compartment temperature set point, TRS, the CPU 80 initiates the first mode of operation by applying an output signal to the optical coupler 90, which in turn provides 115 volts A.C. on line 100 to energize the refrigerator evaporator fan 28.

In the first mode of operation, the average refrigerator compartment temperature, TR, is sampled by the CPU 80 every 30 seconds. At each of these 30 second time intervals, the CPU calculates the instantaneous divergence of the refrigerator compartment temperature, TR, from the set point, TRS. The CPU 80 then subtracts the previously calculated temperature divergence from the newly calculated temperature divergence. This comparison is the time derivative of the temperature within the refrigerator compartment 14 as given by the following equation:

$$\frac{(TR_{new} - TRS) - (TR_{old} - TRS)}{t_{new} - t_{old}} = \frac{\Delta TR}{\Delta t} = \frac{dTR}{dt}$$

where t=time at which the temperature reading was taken This derivative will be negative as long as the temperature within compartment 14 is decreasing, but will become zero and go positive once the point is reached at which the evaporator fan alone, without operation of the compressor 44, can no longer reduce the temperature of the compartment 14. For every positive derivative calculated, a counter in the CPU is incremented by one. After three counts have been accumulated, indicating that the refrigerator compartment 14 has been warming for at least 1½ minutes, the second mode of operation is initiated.

Figure 2:
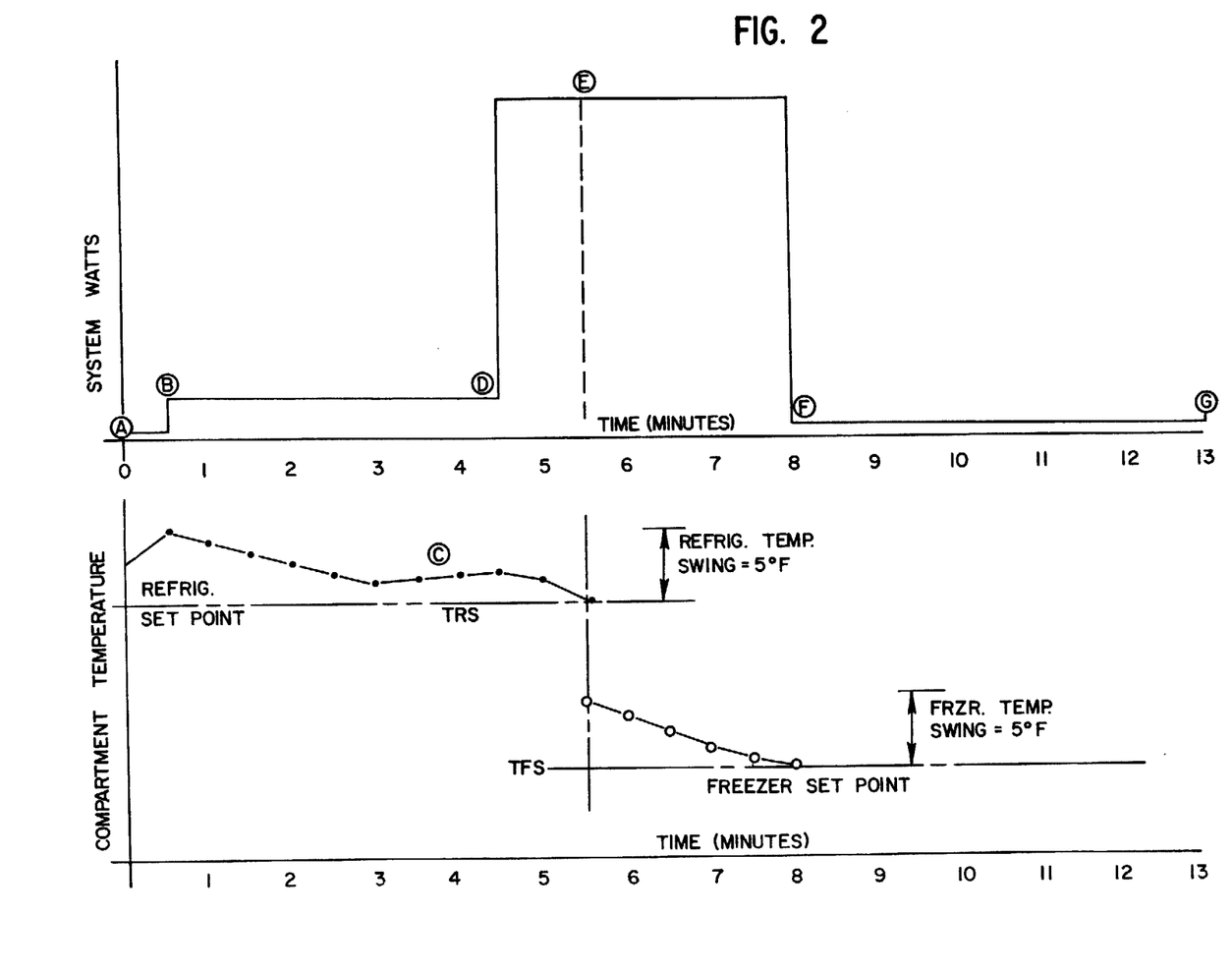
FIG. 2 is a graph of power and the refrigerator and freezer temperatures versus time illustrating the sequential operation of the refrigeration system of the present invention.

During the first mode of operation with the refrigerator evaporator fan 28 operating, the warm air from the refrigerator compartment 14 flowing across the evaporator coil is cooled, lowering the temperature of the refrigerator compartment as can be seen for the first 2½ minutes of the fan's operation in FIG. 2. As it passes over the evaporator, the above-freezing air from compartment 14 heats the evaporator coil 20 and any frost that has accumulated thereon begins to melt, converting the air heat to latent heat of fusion. As this heat exchange continues, the temperature differential between the accumulated frost on the evaporator coil 20 and the air decreases, so that less heat is transferred. Concurrent with the evaporator/frost heat exchange, the added heat load of the evaporator fan and the ambient heat infiltration tend to make the refrigerator compartment air temperature rise, as illustrated in FIG. 2, after approximately three minutes of the system operation. After the air temperature within compartment 14 has been warming for 30 seconds, as indicated at point C, the first positive time derivative of temperature is calculated and the CPU increments the counter to 1. At 4½ minutes, the third positive derivative is calculated indicating that the refrigerator compartment 14 has been warming for 1½ minutes and the CPU 80 initiates the second mode of operation at point D.

In the second mode of operation, the CPU 80 provides an output signal to the optical coupler 94 which switches the 115 volts A.C. to the compressor relay 106, thereby energizing the compressor 44 and the condenser fan 48, with the refrigerator evaporator fan 28 remaining on, to cool the refrigerator compartment 14. After approximately 1 minute of compressor operation, as indicated by point E, the refrigerator compartment temperature has reached the set point, TRS, indicating that the compartment has been adequately cooled. At this point, the CPU 80 samples the freezer compartment temperature with the refrigerator evaporator fan 28, compressor 44 and condenser fan 48 remaining on. If the freezer compartment temperature, TF, is 5° or more above the freezer compartment set point, TFS, the CPU 80 initiates the third mode of operation.

In the third mode, the CPU 80 de-energizes the refrigerator evaporator fan 28 and energizes the freezer evaporator fan 30 through the optical coupler 88, the compressor 44 and condenser fan 48 remaining on. The freezer compartment temperature is sampled every 30 seconds until the temperature, TF, falls to the freezer compartment set point, TFS. At point F, when the freezer compartment has been adequately cooled, the CPU 80 deenergizes the freezer evaporator fan 30, the compressor 44 and the compressor fan 48 to terminate the third mode of operation. The CPU 80 waits a minimum of 5 minutes, until point G, before permitting initiation of the next cycle. This prevents the compressor from being re-energized until the expiration of this period, insuring that the compressor will not overload due to adverse pressure differentials. After the 5 minute waiting period has expired, the temperature of the refrigerator compartment 14 is again sampled to determine whether it is adequately cooled.

Assuming that the refrigerator compartment 14 requires cooling, cooling is always initiated in the first mode of operation and, as can be seen from FIG. 2, cooling in this mode is accomplished with a minimum expenditure of energy. Since the first mode of operation not only cools the refrigerator compartment 14 but also removes frost from the evaporator coil 20, the overall operating efficiency of the system is enhanced. If the first mode of operation is not sufficient to adequately cool the refrigerator compartment, the refrigeration apparatus (the compressor 44, the condenser 46, and the condenser fan 48) provides the remainder of the cooling. Although during operation in the second mode more energy is expended, the system can be operated at a comparatively high coefficient of performance due to the thermostatic expansion valve 54 which modulates the flow of refrigerant to the evaporator coil 20 in response to the relatively warmer air from compartment 14 so that the compartment 14 is cooled at a higher evaporator temperature and pressure than during the cooling of the freezer compartment. Because the freezer compartment 12 is checked to determine whether cooling is required before de-energizing the compressor, transient losses which would occur if the compressor were turned off are avoided.

The operation of the sequential control will now be described in detail with reference to FIGS. 3-5. At the start of the system operation, block 109 samples the temperature, TR, of the refrigerator compartment 14, as sensed by the thermistor 60. A block 110 calculates the refrigerator temperature divergence, RLO, by subtracting the refrigerator temperature set point, TRS, from the sampled refrigerator temperature, TR. The refrigerator temperature divergence is evaluated by a block 111 and if less than 5° indicating that the refrigerator temperature is within the allowable range and adequately cooled, a branch 112 is taken to point A of FIG. 4 where the freezer temperature is checked. If the refrigerator temperature divergence is greater than or equal to 5°, before initiating the first mode of operation, a block 114 determines whether the compressor 44 has been running for more than 24 hours. If the compressor has been running for this length of time, a branch 116 is taken to point D of FIG. 5 for the defrost mode.

A block 118 initializes a counter by setting a counting variable, FL, equal to 0 and a block 120 initiates the first mode of operation by turning on the refrigerator evaporator fan 28 through the optical coupler 90. After 30 seconds, the refrigerator temperature, TR, is again sampled by a block 122 and at block 124 an updated refrigerator temperature divergence, RLN, is calculated by subtracting the refrigerator temperature set point, TRS, from the refrigerator temperature TR sampled at block 122. If the refrigerator compartment has been adequately cooled so that RLN is less than or equal to 0, the freezer temperature is checked at point A, FIG. 4. However, if the refrigerator temperature is still above the refrigerator temperature set point, a block 126 evaluates the time derivative of the temperature, i.e., the rate of temperature change, by subtracting the previously calculated refrigerator temperature divergence RLO from the refrigerator temperature divergence RLN calculated at block 124. If the derivative of the temperature is less than zero indicating that the refrigerator compartment temperature is decreasing, a block 128 updates the refrigerator temperature divergence by setting the old refrigerator temperature divergence RLO equal to the last calculated refrigerator temperature divergence RLN. A branch 130 is then taken so that after the next 30 second time interval the refrigerator temperature TR is sampled again.

If the derivative of the refrigerator temperature was determined to be positive by block 126 indicating that the refrigerator is warming, the counting variable FL is incremented by one at block 132. At block 134 a determination is made as to whether the counting variable FL is greater than 2 and if not the refrigerator temperature divergence is updated at block 128, branch 130 being taken for the next sample refrigerator temperature. The refrigerator compartment 14 continues to be cooled by defrosting the evaporator with only the evaporator fan 28 operating until either the refrigerator temperature is satisfied as determined by block 125 or at least 3 counts have been accumulated in the counter as determined by block 134.

If three positive derivatives of the refrigerator temperature have been calculated, such that FL is greater than two, the compressor 44 and condenser fan 48 are turned on by a block 136, initiating the second mode of operation. A block 138 then resets the counter to zero by setting FL equal to 0. The refrigerator compartment continues to be cooled with the refrigerator evaporator fan 28 operating and the compressor 44 and condenser fan 48 on until block 125 determines that the refrigerator compartment 14 has been adequately cooled, at which point branch 140 is taken to point A as shown in FIG. 4.

Figure 4:
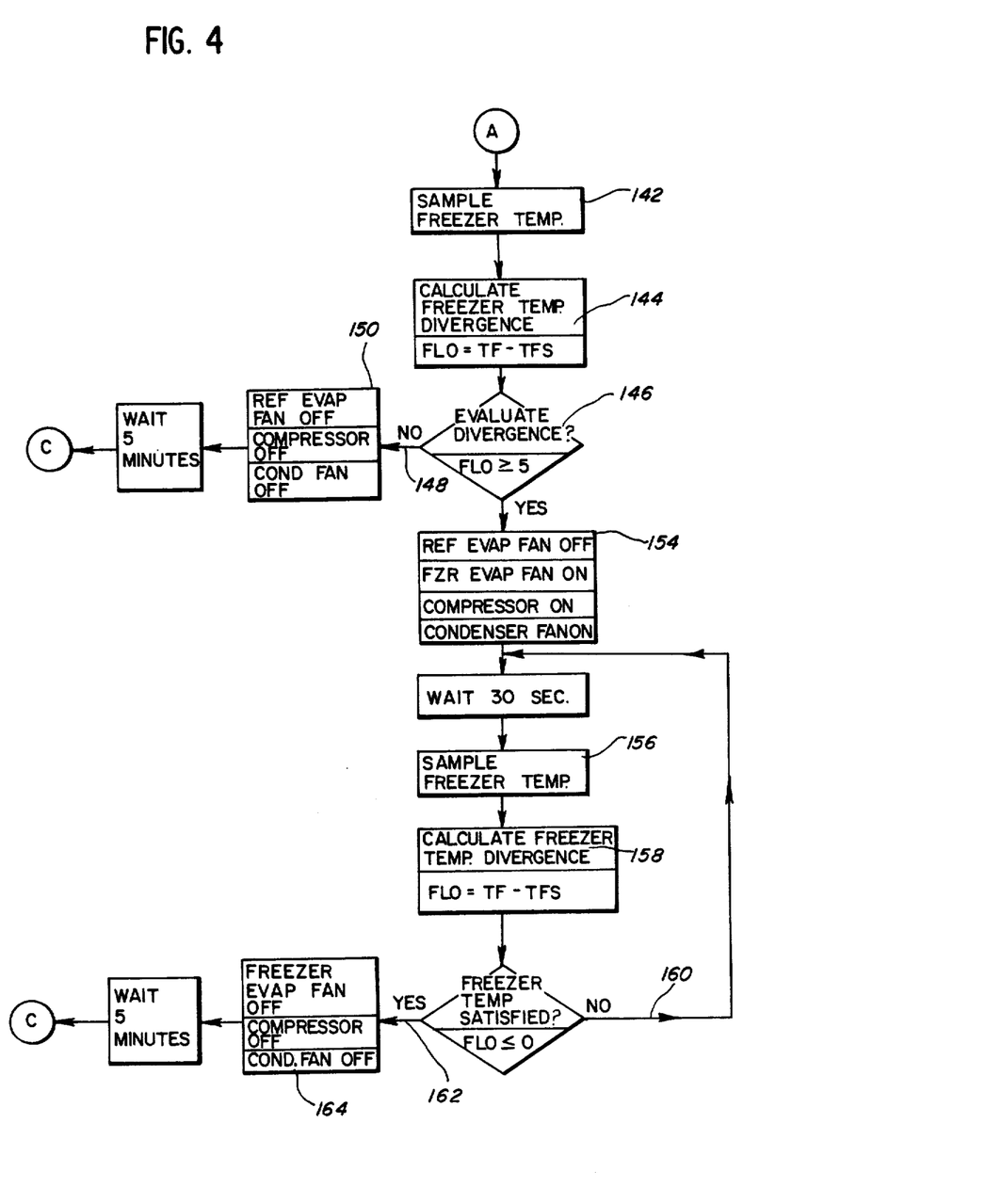

Referring to FIG. 4, after the refrigerator compartment 14 has been adequately cooled, a block 142 samples the temperature of the freezer compartment 12 as sensed by the thermistor 64. A block 144 calculates the freezer temperature divergence, FLO, by subtracting the freezer temperature set point, TFS, from the freezer temperature, TF, sampled by block 142. A block 146 evaluates the freezer temperature divergence, FLO, and if it is less than 5° indicating that the freezer is adequately cooled, a branch 148 is taken to block 150 where the refrigerator evaporator fan 28, the compressor 44 and the compressor fan 48 are turned off. After the compressor is turned off at block 150, the processor 80 waits 5 minutes before the next cycle is initiated to insure that the compressor is not overloaded.

If the block 146 determines that the freezer temperature divergence, FLO, is greater than or equal to 5°, indicating that the freezer compartment needs cooling, the refrigerator evaporator fan 28 is turned off and the freezer evaporator fan 30 is turned on by a block 154. In case they were not already energized, the block 154 also turns on the compressor 44 and the condenser fan 48, initiating the third mode of operation. After a 30 second time interval, the freezer temperature is again sampled by a block 156 and a block 158 calculates the updated freezer temperature divergence FLO. If FLO is greater than zero, the freezer temperature has not been satisfied, and a branch 160 is taken. After another 30 second time interval, the freezer temperature is again sampled, and this process is repeated until the sensed freezer temperature reaches the freezer temperature set point. Once the freezer compartment 12 has been adequately cooled, a branch 162 is taken and the freezer evaporator fan 30, the compressor 44 and the condenser fan 48 are turned off by block 164. The CPU then waits for 5 minutes before initiating the next cycle at point C to insure that the compressor is not re-energized too soon.

Figure 3:
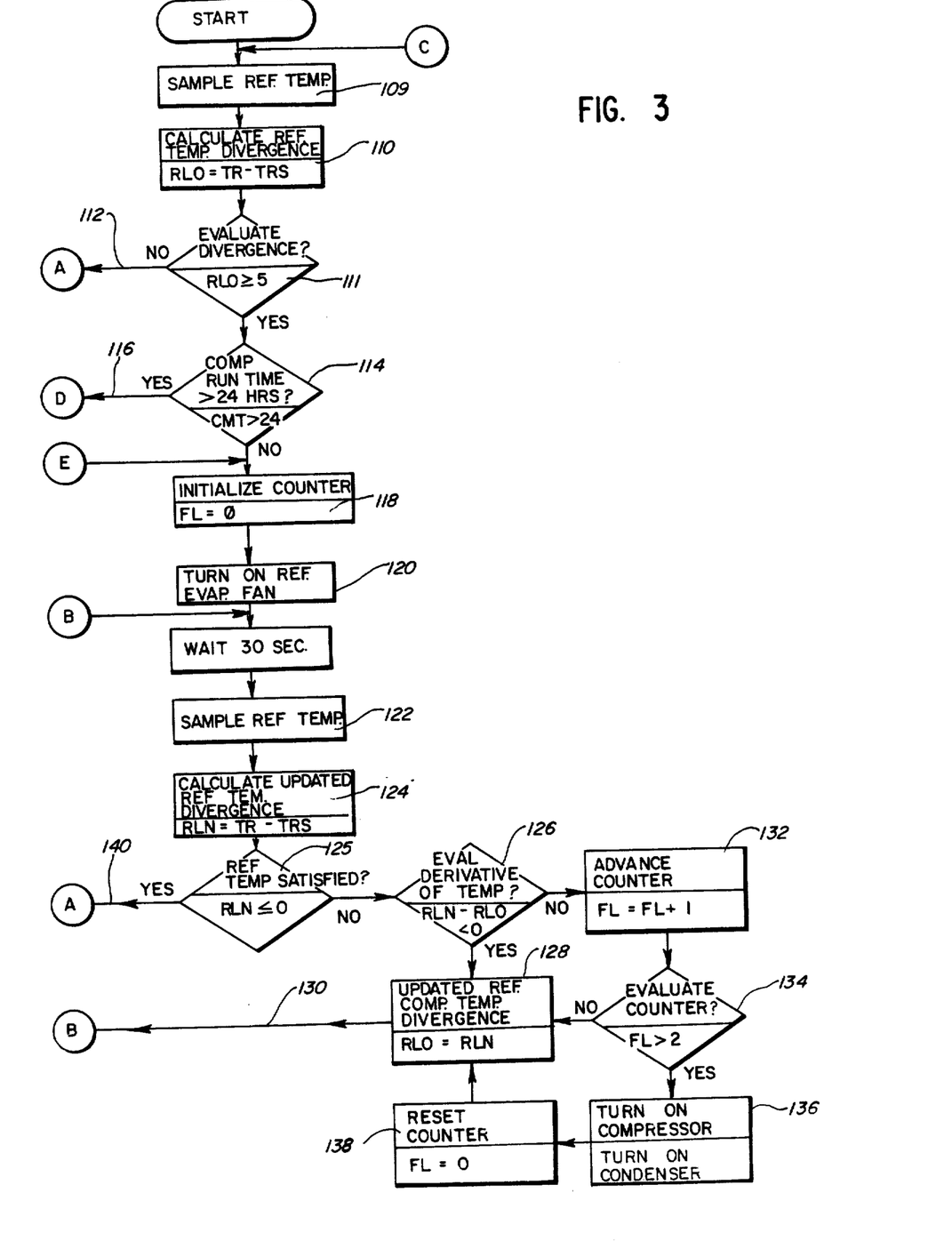
FIGS. 3, 4 and 5 comprise a single flow chart of the control program contained in the sequential control system.
Figure 5:
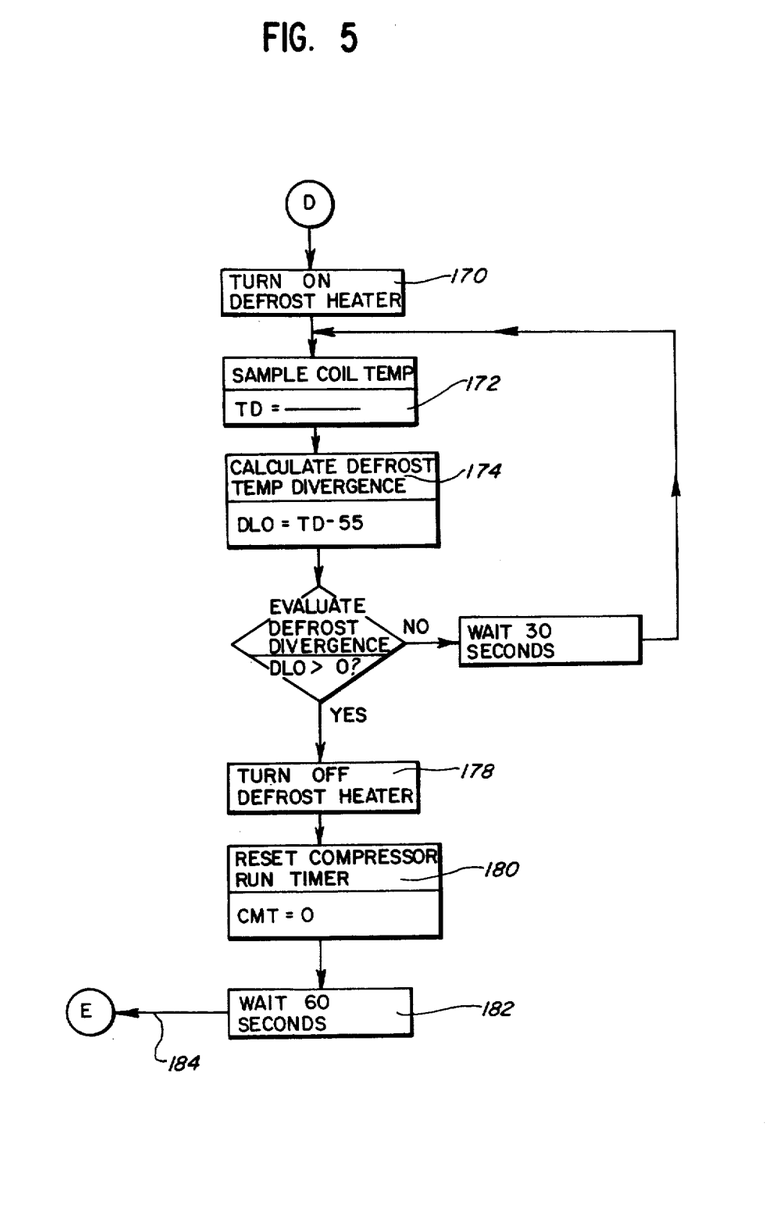

If the block 114, FIG. 3, determines that the compressor 44 has been running for more than 24 hours, a branch 116 is taken to point D of FIG. 5. A block 170 initiates a defrost operation by turning on the defrost heater 26. A block 172 samples the evaporator coil temperature, TD, as sensed by the thermistor 66 and a block 174 calculates the defrost temperature divergence, DLO, by subtracting 55° from the sampled evaporator coil temperature, TD. If the defrost temperature divergence is less than 0, indicating that the evaporator coil has not been adequately warmed, after 30 seconds the evaporator temperature is again sampled, and this process is repeated until the divergence is greater than or equal to 0 at which point the defrost heater is turned off by a block 178 and the compressor run timer, CMT, is reset equal to 0 by a block 180. After a 60 second wait at block 182, a branch 184 is taken and the refrigerator evaporator fan 28 is turned on initiating the first mode of operation at block 120.

Having described the invention, the embodiments of the invention in which an exclusive property or priviledge is claimed are defined as follows:

1. In a refrigeration apparatus having a refrigerated compartment, an evaporator, an evaporator fan for circulating air over said evaporator and through said compartment, a single compressor for supplying refrigerant to said evaporator and means for sensing the temperature within said compartment, a control comprising:
   means for sensing the temperature within said compartment;
   means for determining the rate of temperature change within said compartment; and
   means for initiating operation of said compressor when the sensed temperature within said compartment is above a predetermined temperature and the rate of temperature change within said compartment reaches a predetermined value.

2. In a refrigeration apparatus having a refrigerated compartment, an evaporator, an evaporator fan for circulating air over said evaporator and through said compartment, a compressor for supplying refrigerant to said evaporator and means for sensing the temperature within said compartment, a control comprising:
   fan control means for initiating the operation of said evaporator fan when the sensed temperature within said compartment rises above a first predetermined temperature;
   means for determining the rate of temperature change within said compartment;
   compressor control means responsive to said determining means for initiating the operation of said compressor when the rate of temperature change within said compartment reaches a predetermined value indicating that the temperature within said compartment is no longer being reduced; and
   means for terminating the operation of said evaporator fan when the sensed compartment temperature reaches a second predetermined temperature.

3. The refrigeration apparatus of claim 2 wherein the compressor control means initiates operation of said compressor when the rate of temperature change with said compartment is positive for at least a minimum period of time.

4. The refrigeration apparatus of claim 2 wherein the determining means calculates the rate of temperature change at predetermined intervals of time.

5. The refrigeration apparatus of claim 4 wherein the compressor control means initiates the operation of the compressor when the rate of temperature change is greater than said predetermined value for a minimum number of said time intervals.

6. The refrigeration apparatus of claim 2 further including
   means for determining the running time of the compressor; and
   means for defrosting the evaporator if the compressor has been running for a predetermined period of time.

7. In a refrigeration apparatus having a refrigerated compartment, an evaporator, an evaporator fan for circulating air over said evaporator and through said compartment, a compressor for supplying refrigerant to said evaporator and means for sensing the temperature within said compartment; a control comprising:
   fan control means for initiating operation of said evaporator fan to cool said compartment when the sensed temperature rises above a first predetermined temperature;
   means for sampling the sensed temperature at predetermined time intervals;
   means for comparing the temperature sampled at one time interval to the temperature sampled at a preceding time interval;
   compressor control means for initiating the operation of said compressor when the temperature sampled at said one time interval is greater than or equal to the temperature sampled at said preceding time interval.

8. The refrigeration apparatus of claim 7 wherein the compressor control means initiates the operation of said compressor when a predetermined number of sampled temperatures are greater than their preceding sampled temperatures.

9. The refrigeration apparatus of claim 7 wherein said comparing means includes
   means for calculating the divergence of each sampled temperature from a set point temperature; and
   means for comparing the divergence of a sampled temperature to the divergence of the preceding sampled temperature, said compressor control means initiating operation of the compressor when a calculated divergence is greater than the preceding divergence.

10. The refrigeration apparatus of claim 9 further including means to terminate the cooling of said compartment when the divergence of a sampled temperature from said set point temperature is less than or equal to zero.

11. In a refrigeration apparatus having a refrigerated compartment, an evaporator, an evaporator fan for circulating air over said evaporator and through said compartment, a compressor for supplying refrigerant to said evaporator and means for sensing the temperature within said compartment, a control comprising:
   fan control means for initiating the operation of said evaporator fan to cool said oompartment when the sensed temperature within the compartment rises above a set point temperature by a predetermined amount;
   means for determining the rate of temperature change within said compartment at predetermined intervals of time;
   a counter;
   means for incrementing the counter each time the rate of temperature change determined is greater than a predetermined value;

compressor control means responsive to said counter for initiating operation of said compressor when a predetermined number of counts have been accumulated in said counter; and means for terminating the cooling of said compartment when the sensed compartment temperature reaches said set point temperature.

12. The refrigeration apparatus of claim 11 wherein said determining means calculates the time derivative of the temperature within said compartment and said incrementing means increments the counter each time a positive time derivative is calculated.

13. The refrigeration apparatus of claim 11 wherein said determining means further includes:

means for sampling the sensed temperature at each of said time intervals; and means for comparing the temperature sampled at one time interval to the temperature sampled at the preceding time interval.

14. The refrigeration apparatus of claim 13 wherein said incrementing means increments the counter if the temperature sampled at said one time interval is greater than the temperature sensed at the preceding time interval.

15. The refrigeration apparatus of claim 11 wherein said determining means includes means for calculating the divergence of the sensed temperature from said second set point at each of said time intervals; and means for comparing the divergence calculated at one time interval to the divergence calculated at the preceding time interval.

16. The refrigeration apparatus of claim 15 wherein said incrementing means increments the counter if the divergence calculated at said one time interval is greater than the divergence calculated at the preceding time interval.

17. In a refrigeration apparatus having a first refrigerated compartment and a second refrigerator compartment, an evaporator, air circulation means for selectively circulating air over said evaporator and through said first or second compartments, a compressor for supplying refrigerant to said evaporator and means for sensing the temperature within each of said compartments, a control comprising:

means for initiating operation of said air circulation means to circulate air over said evaporator and through said first compartment when the sensed temperature within the first compartment rises above a first predetermined temperature;

means for determining the rate of temperature change within said first compartment;

compressor control means responsive to said determining means for initiating operation of said compressor when the rate of temperature change within said first compartment reaches a predetermined value; and means for changing the operation of said air circulation means to circulate air over said evaporator and through said second compartment when the sensed temperature in the first compartment has been lowered to a second predetermined temperature and the sensed temperature of said second compartment is above a third predetermined temperature.

18. The refrigeration apparatus of claim 17 wherein said air circulation means terminates the flow of air over said evaporator and said compressor control means terminates the operation of said compressor when the sensed temperature within said first compartment reaches the second predetermined temperature and the sensed temperature within said second compartment is less than said third predetermined temperature.

19. The refrigeration apparatus of claim 17 further including means for comparing the sensed temperature in the second compartment to a fourth predetermined temperature and means for terminating the operation of said compressor when the sensed temperature within said second compartment has been reduced to said fourth predetermined temperature.

20. The refrigeration apparatus of claim 17 further including means for determining the running time of the compressor; and means for defrosting the evaporator if the compressor has been running for a predetermined period of time.

21. The refrigeration apparatus of claim 17 wherein the means for sensing the temperature includes a weighted thermistor disposed within each of the first and second compartments.

22. The refrigeration apparatus of claim 17 wherein said first refrigerated compartment is maintained at above-freezing temperatures and said second refrigerated compartment is maintained at below freezing temperatures.

23. In a refrigeration apparatus having a freezer compartment and a refrigerator compartment, an evaporator, air circulation means for selectively circulating air over said evaporator and through said compartments, a compressor for supplying refrigerant to said evaporator and means for sensing the temperature of said compartments, a control comprising:

means for initiating operation of said air circulation means to cool said refrigerator compartment when the sensed temperature of said refrigerator compartment rises above a set point temperature by a first predetermined amount;

means for determining the rate of temperature change within said refrigerator compartment;

compressor control means responsive to said determining means for initiating operation of said compressor when the rate of temperature change within said refrigerator compartment reaches a predetermined value;

means for changing the operation of said air circulation means to terminate cooling of said refrigerator compartment and cool said freezer compartment when the sensed temperature in said refrigerator compartment reaches said set point temperature and the temperature in said freezer compartment is above a predetermined temperature; and means for modulating the flow of refrigerant to said evaporator to operate said evaporator at a temperature and pressure during the cooling of said refrigerator compartment than during cooling of said freezer compartment.

24. The refrigeration apparatus of claim 23 further including means for sensing the temperature of the evaporator, and wherein said modulating means modulates the flow of refrigerant in response to the sensed evaporator temperature.

25. The refrigeration apparatus of claim 23 wherein the modulating means restricts the flow of refrigerant to the evaporator during cooling of the refrigerator compartment to operate the evaporator at a higher temperature and pressure than during cooling of the freezer compartment.

26. The refrigeration apparatus of claim 23 wherein the modulating means maintains a nearly constant superheat of the refrigerant out of the evaporator.

27. The refrigeration apparatus of claim 23 wherein the modulating means is a thermostatic expansion valve disposed at an inlet of the evaporator.

28. The method of controlling a refrigeration apparatus having a refrigerated compartment, an evaporator, an evaporator fan for circulating air over said evaporator and through said compartment, a compressor for supplying refrigerant to said evaporator and means for sensing the temperature within said compartment, comprising:
    comparing the sensed temperature within the compartment to a predetermined temperature;
    initiating operation of said evaporator fan to cool the compartment if the sensed temperature is greater than or equal to said predetermined temperature;
    sampling the temperature within the compartment at predetermined time intervals;
    determining the rate of temperature change at each of said time intervals;
    initiating the operation of said compressor when the rate of temperature change determined at a predetermined number of time intervals reaches a predetermined value.

29. The method of claim 28 further including the steps of:
    comparing each sampled temperature to a set point temperature; and,
    terminating the cooling of said compartment if the sampled temperature is less than or equal to said set point temperature.

30. The method of claim 28 wherein the step of determining the rate of temperature change includes:
    calculating the divergence of a sampled temperature from a set point temperature; and,
    subtracting from the divergence calculated at one time interval, the divergence calculated at the preceding time interval.

31. The method of controlling a refrigeration apparatus having a refrigerator compartment and a freezer compartment, an evaporator, an evaporator fan for circulating air over said evaporator and through each of said compartments, a compressor for supplying refrigerant to said evaporator and means for sensing the temperature within each of said compartments, comprising:
    determining whether the temperature within said refrigerator compartment is above a predetermined temperature;
    initiating the operation of said evaporator fan to circulate air through the refrigerator compartment if the temperature within said refrigerator compartment is above said predetermined temperature;
    determining the rate of temperature change within said refrigerator compartment;
    initiating the operation of said compressor if the rate of temperature change reaches a predetermined value; and
    terminating cooling of said refrigerator compartment and initiating cooling of said freezer compartment when the temperature within said refrigerator reaches a set point temperature.

32. The method of claim 31 further including the step of modulating the flow of refrigerant to the evaporator to operate the evaporator at a higher temperature during cooling of the refrigerator compartment than during cooling of the freezer compartment.

* * * * *